No. 883,457. PATENTED MAR. 31, 1908.
C. GEIS.
SHEARS.
APPLICATION FILED DEC. 19, 1907.
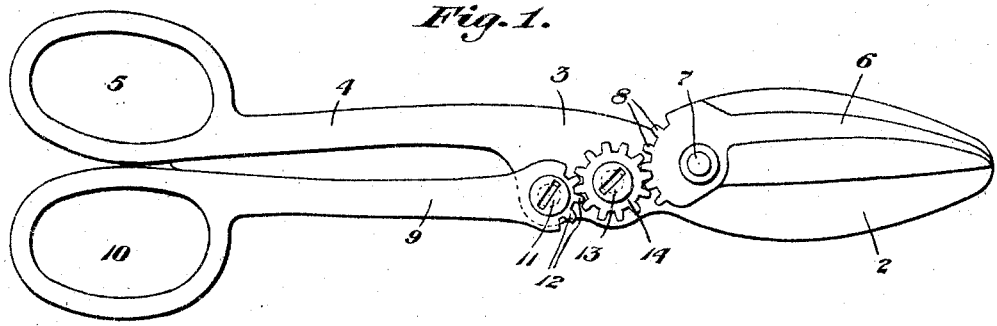
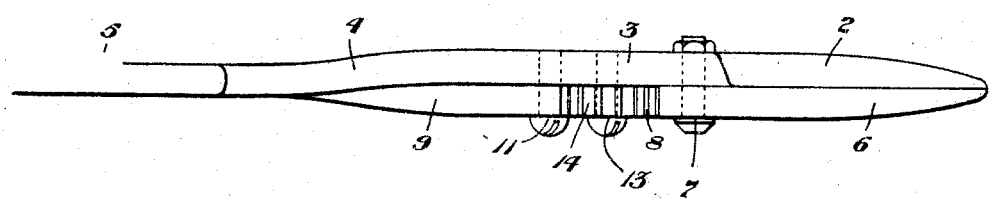
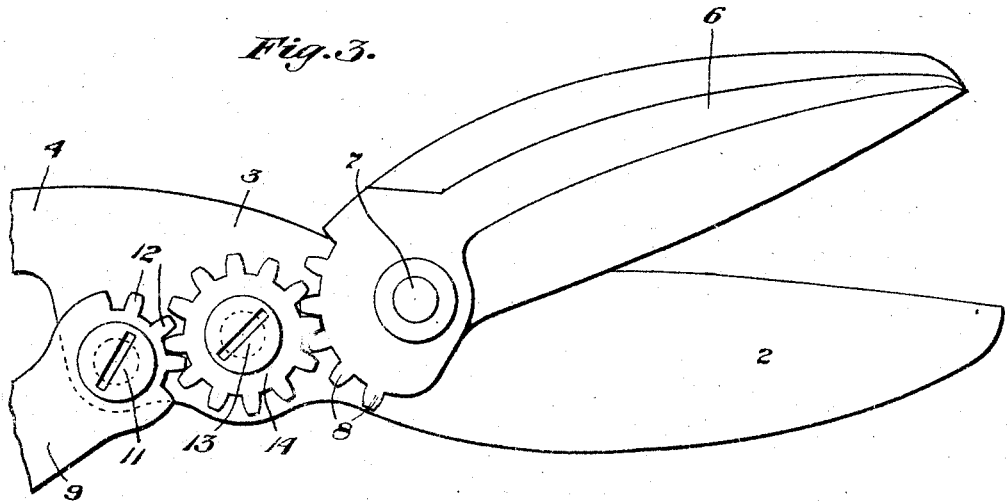
Witnesses:
Chas. S. Sepley.
Henry Sens.
Inventor:
Charles Geis
by C. M. Clarke
his Attorney

UNITED STATES PATENT OFFICE.

CHARLES GEIS, OF WILKINSBURG, PENNSYLVANIA.

SHEARS.

No. 883,457.  Specification of Letters Patent.  Patented March 31, 1908.

Application filed December 19, 1907. Serial No. 407,120.

*To all whom it may concern:*

Be it known that I, CHARLES GEIS, a citizen of the United States, residing at Wilkinsburg, in the county of Allegheny and State of Pennsylvania, have invented certain new and useful Improvements in Shears, of which the following is a specification, reference being had therein to the accompanying drawing.

My invention refers to an improvement in shears, more particularly shears for cutting sheet metal or any similar hard resisting metal, and it has for its object to provide a device wherein the shearing power is increased and the strain on the hand of the operator correspondently reduced.

The invention consists in providing between one of the shear blades and its operating handle, communicating gearing whereby motion of the handle will be transmitted to the shear, in the manner hereinafter described.

Referring to the drawings: Figure 1 is a view in front elevation of a shear constructed in accordance with my invention, showing the shears closed. Fig. 2 is a plan view of Fig. 1. Fig. 3 is a view similar to Fig. 1, but showing the shears open.

One of the shear members is continuous and preferably integral, similar to any ordinary shear, consisting of the shear blade 2, middle body portion or base 3 and operating or gripping handle 4, terminating in the usual oval grip 5 of ordinary construction.

6 is the other shear blade pivotally mounted at 7 upon the rear portion of blade 2 and provided with a segmental series of teeth 8 radially arranged around the pivotal center 7, and of sufficient annular scope to provide for the full desired travel of blade 6.

9 represents the operating handle for blade 6, provided like handle 4, with a grip terminal 10, which handle 9 is pivotally mounted at 11 on the base 3 of the other co-operating member as shown, and provided at its forward terminal with a segmental series of teeth 12 similar to the series 8.

Between teeth 8 and 12, pivotally mounted at 13 on a stud inserted in the shear member 3, like the mounting of pivot bearings 7 and 11, is an idler pinion 14 in mesh with teeth 8 and 10 respectively, and adapted to transmit motion to handle 9 as will be readily understood. The pitch radii of teeth 12 and 8 respectively may be so proportioned as to secure the desired leverage depending on the work in view, the length of the blades, or any of the conditions controlling the use of the shears.

By decreasing the radius of teeth 12 and increasing the radius of teeth 8, the leverage may be increased with a corresponding reduction of blade travel, and by reversing these conditions, the travel of the blade may be increased with a corresponding reduction of power. I do not, however, desire to be in any way limited to the proportions of these parts and it will be understood that they may be changed or varied by the skilled mechanic to suit the conditions of use and that the device may be otherwise modified without departure from the scope of the following claims.

What I claim and desire by Letters Patent is.

1. A shear consisting of a continuous handle and blade, a blade pivotally mounted at one side of said blade and handle, an independent operating handle pivotally mounted and operable on the continuous handle, and gearing embodying an idler gear arranged to transmit motion from said handle to the pivoted blade.

2. A shear consisting of a continuous handle and blade, a blade pivotally mounted thereon provided with segmental teeth, an independent pivotally mounted handle provided with segmental teeth of less radii than the blade teeth, and an intervening idler gear meshing into the teeth of the blade and handle respectively, substantially as set forth.

3. In a shear, the combination of a blade and handle therefor, a blade pivotally mounted thereon and provided with gear teeth, a pivotally mounted handle provided with gear teeth, and an intervening toothed gear arranged to transmit motion from said handle to said blade, substantially as set forth.

In testimony whereof I affix my signature in presence of two witnesses.

CHARLES GEIS.

Witnesses:
 FRANK C. LINK,
 A. C. ROBERTSON.